(12) United States Patent
Nishimura et al.

(10) Patent No.: US 6,699,936 B1
(45) Date of Patent: Mar. 2, 2004

(54) RUBBER COMPOSITION FOR HOSE AND HOSE

(75) Inventors: Koichi Nishimura, Kawasaki (JP); Shigeru Fujita, Kawasaki (JP); Toshio Ohkawa, Kawasaki (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 09/926,824

(22) PCT Filed: Jun. 26, 2000

(86) PCT No.: PCT/JP00/04193

§ 371 (c)(1),
(2), (4) Date: Dec. 26, 2001

(87) PCT Pub. No.: WO01/00725

PCT Pub. Date: Jan. 4, 2001

(30) Foreign Application Priority Data

Jun. 24, 1999 (JP) ............................................. 11/177970

(51) Int. Cl.⁷ ............................ C08L 41/00; C08L 47/00
(52) U.S. Cl. ....................................... 525/208; 525/233
(58) Field of Search .................................. 525/208, 233

(56) References Cited

U.S. PATENT DOCUMENTS 4,048,261 A * 9/1977 Starmer ...................... 525/187

* cited by examiner

*Primary Examiner*—James J. Seidleck
*Assistant Examiner*—Thao T. Tran
(74) *Attorney, Agent, or Firm*—Armstrong, Kratz, Quintos, Hanson & Brooks, LLP

(57) ABSTRACT

A rubber composition for a hose, which comprises a nitrile rubber (A) comprising 45–55 weight % of α,β-ethylenically unsaturated nitrile monomer units and 55–45% by weight of conjugated diene monomer units, an epihalohydrin rubber (B), and a crosslinking agent ($C_A$) for the nitrile rubber and/or a crosslinking agent ($C_B$) for the epihalohydrin rubber; the amount of nitrile rubber (A) being 25–80 weight % based on the sum of nitrile rubber (A) and epihalohydrin rubber (B); and a hose having a layer comprised of a crosslinked product of the rubber composition. The hose has excellent resistance to fuel oil permeation and cold resistance, and therefore, it is especially suitable as fuel oil hoses of an automobile.

11 Claims, No Drawings

RUBBER COMPOSITION FOR HOSE AND HOSE

TECHNICAL FIELD

This invention relates to a rubber composition comprising a nitrile rubber and an epihalohydrin rubber. More particularly it relates to a rubber composition for hoses comprising a specific nitrile rubber, epihalohydrin rubber and a specific crosslinking agent, which has enhanced resistance to fuel oil permeation and cold resistance. This invention further relates to a hose having a layer comprised of a crosslinked product of the rubber composition for hoses.

BACKGROUND ART

For fuel hoses of automobiles, enhanced resistance to fuel oil permeation and cold resistance are required for controlling dissipation of fuel oil such as gasoline into the air and preventing embrittlement under severe cold conditions, for example, at a temperature of −30° C. As rubber materials for fuel hoses, nitrile rubber, a polyblend of nitrile rubber and vinyl chloride resin (PVC) and epihalohydrin rubber are widely used.

In recent years, regulations for controlling automobile exhaust have become tightened to preserve the environment. Thus, hoses having good resistance to fuel oil permeation are desired. As techniques for enhancing the resistance to fuel oil permeation, there can be mentioned an attempt of increasing the wall thickness of hoses and an attempt of using a rubber material having excellent resistance to fuel oil permeation. However, the increase of the wall thickness of hoses contradictory to requirement of weight-saving of automobiles. Recent tendency of miniaturization and high integration of automobile engines makes it difficult to install hoses with a thick wall within a limited space. Therefore a rubber material exhibiting excellent resistance to fuel oil permeation is eagerly desired.

To comply with the above-requirement, in the case of nitrile rubber hoses, an attempt of increasing the content of α,β-ethylenically unsaturated nitrile monomer units in the nitrile rubber is considered. This attempt enhances the resistance to fuel oil permeation, but reduces the cold resistance. Thus the hoses cannot be used in cold districts.

In the case of hoses of the nitrile rubber/vinyl chloride resin, an attempt of increasing the content of α,β-ethylenically unsaturated nitrile monomer units in the nitrile rubber and an attempt of increasing the proportion of PVC resin in the polyblend are considered. These attempts contribute to enhancement of the resistance to fuel oil permeation, but the cold resistance is reduced. Further PVC is not desired from the viewpoint of environment preservation.

In the case of hoses of epihalohydrin rubber, the resistance to fuel oil permeation increases with an increase of the content of epihalohydrin units in the rubber, but, the resistance to fuel oil permeation is sometimes not to the desired even though the rubber is an epihalohydrin homopolymer. That is, an improvement of resistance to fuel oil permeation to the satisfying extent has been difficult. Further, the increase of the epihalohydrin unit content in the rubber leads to reduction of the cold resistance.

DISCLOSURE OF THE INVENTION

In view of the foregoing, an object of the present invention is to provide a hose having improved resistance to fuel permeation and cold resistance, and further to provide a rubber material used for the production thereof.

The present inventors made extensive researches to achieve the above-mentioned object, and have found that a rubber composition comprising a specific nitrile rubber (A), epihalohydrin rubber (B) and a specific crosslinking agent, wherein the ratio in amount of nitrile rubber (A)/epihalohydrin rubber (B) is in a specific range, exhibits enhanced resistance to fuel consumption and cold resistance. Based on this finding, the present invention has been completed.

Thus, in accordance with the present invention, there is provided a rubber composition for a hose, which comprises a nitrile rubber (A) comprising 45 to 55% by weight of α,β-ethylenically unsaturated nitrile monomer units and 55 to 45% by weight of conjugated diene monomer units, an epihalohydrin rubber (B), and a crosslinking agent ($C_A$) for the nitrile rubber (A) and/or a crosslinking agent ($C_B$) for the epihalohydrin rubber (B); the amount of the nitrile rubber (A) being in the range of 25 to 80% by weight based on the sum of the nitrile rubber (A) and the epihalohydrin rubber (B); and further provided a hose having a layer comprised of a crosslinked product of the rubber composition.

BEST MODE FOR CARRYING OUT THE INVENTION

Rubber Composition

The rubber composition for a hose, of the present invention comprises a nitrile rubber (A) comprising 45 to 55% by weight of α,β-ethylenically unsaturated nitrile monomer units and 55 to 45% by weight of conjugated diene monomer units, an epihalohydrin rubber (B), and a crosslinking agent ($C_A$) for the nitrile rubber (A) and/or a crosslinking agent ($C_B$) for the epihalohydrin rubber (B), wherein the amount of nitrile rubber (A) being in the range of 25 to 80% by weight based on the sum of nitrile rubber (A) and epihalohydrin rubber (B).

Nitrile Rubber (A)

The nitrile rubber (A) used in the present invention contains α,β-ethylenically unsaturated nitrile monomer units and conjugated diene monomer units.

The α,β-ethylenically unsaturated nitrile monomer is not particularly limited, and includes, for example, acrylonitrile and methacrylonitrile. Of these, acrylonitrile is preferable in view of the good resistance to fuel oil.

The content of α,β-ethylenically unsaturated nitrile monomer units in nitrile rubber (A) is such that the lower limit is 45% by weight, preferably 47% by weight, and the upper limit is 55% by weight, preferably 53% by weight. If the content of α,β-ethylenically unsaturated nitrile monomer units is too low, the resistance to fuel oil permeation is reduced. In contrast, if the content thereof is too high, the cold resistance is reduced.

The conjugated diene monomer is also not particularly limited, and includes, for example, 1,3-butadiene, 2-methyl-1,3-butadiene, 1,3-pentadiene and 2-chloro-1,3-butadiene. Of these, 1,3-butadiene is preferable in view of the good cold resistance.

The content of conjugated diene monomer units in nitrile rubber (A) is such that the lower limit is 45% by weight, preferably 47% by weight, and the upper limit is 55% by weight, preferably 53% by weight. If the content of conjugated diene monomer units is too low, the cold resistance is reduced. In contrast, if the content thereof is too high, the resistance to fuel oil permeation is reduced.

The nitrile rubber used in the present invention may contain other copolymerizable monomer units. The copolymerizable monomer includes, for example, α-olefin monomers, α,β-ethylenically unsaturated carboxylic acid monomers, α,β-ethylenically unsaturated carboxylic acid ester monomers, α,β-ethylenically unsaturated carboxylic acid amide monomers, vinyl aromatic monomers, carboxylic acid ester monomers of α,β-ethylenically unsaturated alcohols, α,β-ethylenically unsaturated ketone monomers and α,β-ethylenically unsaturated ether monomers.

As specific examples of the α-olefin monomer, there can be mentioned ethylene, propylene and 1-butene.

As specific examples of the α,β-ethylenically unsaturated carboxylic acid monomer, there can be mentioned monocarboxylic acids such as acrylic acid and methacrylic acid; polycarboxylic acids such as maleic acid, fumaric acid and itaconic acid; and partial esters of polycarboxylic acids such an monobutyl fumarate ester, monobutyl maleate ester and monoethyl itaconate ester.

As specific examples of the α,β-ethylenically unsaturated carboxylic acid ester monomer, there can be mentioned alkyl esters such as methyl acrylate, ethyl acrylate, butyl acrylate, 2-ethylhexyl acrylate and lauryl methacrylate; alkoxy-substituted alkyl esters such as methoxyethyl acrylate and methoxyethoxyethyl acrylate; cyano-substituted alkyl esters such as cyanomethyl acrylate, 2-cyanoethyl acrylate, 2-ethyl-6-cyanohexyl acrylate; hydroxy-substituted alkyl esters such as 2-hydroxyethyl acrylate and 2-hydroxyethyl methacrylate; epoxy-substituted alkyl esters such as glycidyl acrylate and glycidyl methacrylate; amino-substituted alkyl esters such as N,N'-dimethylaminoethyl acrylate; halogen-substituted alkyl esters such as 1,1,1-trifluoroethyl acrylate; and complete esters of polycarboxylic acids such as diethyl maleate, dibutyl fumarate and dibutyl itaconate.

As specific examples of the α,β-ethylenically unsaturated carboxylic acid amide monomer, there can be mentioned acrylamide, methacrylamide, N,N'-dimethylacrylamide, N-butoxymethylacrylamide, N-butoxymethylmethacrylamide, N-methylolacrylamide and N,N'-dimethylolacrylamide.

As specific examples of the vinyl aromatic monomer, there can be mentioned styrene, α-methylstyrene, ethylstyrene, butylstyrene, phenylstyrene, vinylnaphthalene, vinylanthracene, butoxystyrene, phenoxystyrene, vinylbenzoic acid, vinylsalicyclic acid, aminostyrene, cyanostyrene, nitrostyrene, chlorostyrene and chloromethylstyrene.

As specific examples of the carboxylic acid ester monomer of an α,β-ethylenically unsaturated alcohol, there can be mentioned vinyl acetate, isopropenyl acetate, vinyl benzoate and vinyl chloroacetate. As specific examples of the α,β-ethylenically unsaturated ketone monomer, there can be mentioned vinyl ethyl ketone and vinyl phenyl ketone. As specific examples of the α,β-ethylenically unsaturated ether monomer, there can be mentioned vinyl methyl ether, vinyl butyl ether, vinyl 2-ethylhexyl ether, vinyl phenyl ether, vinyl glycidyl ether and allyl glycidyl ether.

Further, the copolymerizable monomer includes vinyl chloride, vinylidene chloride and vinylpyridine.

The permissible upper limit of the amount of the copolymerizable monomer in nitrile rubber (A) is preferably 10% by weight, more preferably 6% by weight. When the amount of the copolymerizable monomer is too large, the resulting hose exhibits a reduced elongation and is liable to be cracked or broken, when it is used for a long period at a high temperature.

The Mooney viscosity ($ML_{1+4}$, 100° C.) of nitrile rubber (A) is not particularly limited, but, its lower limit is preferably 25, more preferably 35 and especially preferably 45, and its upper limit is preferably 140, more preferably 120 and especially preferably 100. When the Mooney viscosity is too high or too low, the processability of rubber is degraded.

Epihalohydrin Rubber (B)

Epihalohydrin rubber (B) used in the present invention includes a homopolymer comprising epihalohydrin monomer units, copolymers comprising two or more kinds of epihalohydrin monomer units, and copolymers comprising epihalohydrin monomer units and other copolymerizable monomer units. Epihalohydrin rubber (B) is preferably an epihalohydrin copolymer containing unsaturated epoxide monomer units in view of the mechanical strength.

The epihalohydrin monomer is a compound prepared by substituting a hydrogen atom of ethylene oxide with a halomethyl group, and includes, for example, epihalohydrin, epibromohydrin and β-methylepichlorohydrin. The epihalohydrin monomers may be used as a combination of two or more thereof. Of these, epihalohydrin is preferable because of ease in availability. The content of epihalohydrin monomer units in epihalohydrin rubber (B) is usually at least 40% by weight.

The copolymerizable monomer used for copolymerization includes, for example, alkylene oxides and unsaturated epoxides.

As specific examples of the alkylene oxide, there can be mentioned ethylene oxide, propylene oxide, 1,2-epoxybutane, 1,2-epoxyisobutane, 2,3-epoxybutane, 1,2-epoxyoctane, 1,2-epoxyhexane, 1,2-epoxydecane, 1,2-epoxytetradecane, 1,2-epoxyhexadecane, 1,2-epoxyoctadecane, 1,2-epoxyeicosane, 1,2-epoxycyclopentane, 1,2-epoxycyclohexane and 1,2-epoxycyclododecane. These alkylene oxides may be used as a combination of two or more thereof. Of these, ethylene oxide and propylene oxide are preferable because of ease in availability.

The unsaturated epoxide includes, example, diene monoepoxides, glycidyl ether of α,β-ethylenically unsaturated compounds, and glycidyl ester of carboxyl group-containing α,β-ethylenically unsaturated compounds.

As specific examples of the diene monoepoxide, there can be mentioned butadiene monoepoxide, chloroprene monoepoxide, 4,5-epoxy-2-pentene, epoxy-1-vinylcyclohexene and 1,2-epoxy-5,9-cyclododecadiene.

As specific examples of the glycidyl other of an α,β-ethylenically unsaturated compound, there can be mentioned vinyl glycidyl ether, allyl glycidyl ether, vinylcyclohexane glycidyl ether and o-allylphenyl glycidyl ether.

As specific examples of the glycidyl ester of a carboxyl group-containing α,β-ethylenically unsaturated compound, there can be mentioned glycidyl acrylate, glycidyl methacrylate, glycidyl crotonate, glycidyl 4-heptenate, glycidyl solbate, glycidyl linolate, glycidyl ester of 3-cyclohexenecarboxylic acid and glycidyl ester of 4-methyl-3-cyclohexenecarboxylic acid.

These unsaturated epoxides may be used as a combination of two or more thereof. Of these, allyl glycidyl ether and glycidyl methacrylate are preferable because of ease in availability.

The Mooney viscosity ($ML_{1+4}$, 100° C.) of epihalohydrin rubber (B) is not particularly limited, but, its lower limit is preferably 30 and more preferably 40, and its upper limit is preferably 140 and more preferably 90. When the Mooney viscosity is too high or too low, the processability of rubber is degraded.

The ratio in amount of nitrile rubber (A) and epihalohydrin rubber (B) in the rubber composition for a hose of the present invention is such that the lower limit of the ratio of nitrile rubber (A) to the sum of nitrile rubber (A) and epihalohydrin rubber (B) is 25% by weight, preferably 35% by weight and more preferably 45% by weight, and the upper limit thereof is 80% by weight, preferably 75% by weight and more preferably 70% by weight. That is, the lower limit of the ratio of epihalohydrin rubber (B) to the sum of nitrile rubber (A) and epihalohydrin rubber (B) is 20% by weight, preferably 25% by weight and more preferably 30% by weight, and the upper limit thereof is 75% by weight, preferably 65% by weight and more preferably 55% by weight. If the amount of nitrile rubber (A) is too small and the amount of epihalohydrin rubber (B) is too large, the resistance to fuel oil resistance is reduced. In contrast, if the amount of nitrile rubber (A) is too large and the amount of epihalohydrin rubber (B) is too small, the cold resistance is reduced.

Crosslinking Agent

The rubber composition for a hose of the present invention comprises as an indispensable ingredient a crosslinking agent ($C_A$) for nitrile rubber (A) and/or a crosslinking agent ($C_B$) for epihalohydrin rubber (B). Of the two crosslinking agents, crosslinking agent ($C_A$) for nitrile rubber (A) is preferable in view of the high mechanical strength. More preferably both of crosslinking agent ($C_A$) for nitrile rubber (A) and crosslinking agent ($C_B$) for epihalohydrin rubber (B) are contained.

The amount of the crosslinking agent is preferably in the range of 0.1 phr to 8 phr based on the sum in weight of nitrile rubber (A) and epihalohydrin rubber (B). By the term "phr" as used herein we mean the amount expressed by parts by weight per 100 parts by weight of rubber, i.e., per 100 parts by weight of the sum of nitrile rubber (A) and epihalohydrin rubber (B). This term is also used for the amounts of other ingredients hereinafter explained.

Crosslinking Agent ($C_A$) for Nitrile Rubber (A)

The crosslinking agent ($C_A$) for nitrile rubber includes, for example, sulfur-containing crosslinking agents and organic peroxide crosslinking agents. Of these, sulfur-containing crosslinking agents are preferable because of good storage stability and molding properties of the rubber composition.

The sulfur-containing crosslinking agent is not particularly limited, and includes sulfur and sulfur-donor compounds. As specific examples of the sulfur-donor compound, there can be mentioned tetramethylthiuram disulfide, tetraethylthiuram disulfide, dipentamethylenethiuram disulfide, morpholine disulfide and alkylphenol disulfide. Of the sulfur-containing crosslinking agents, sulfur is preferable. The amount of the sulfur-containing crosslinking agent is such that the lower limit is 0.1 phr and preferably 0.3 phr and the upper limit is 10 phr, preferably 8 phr and more preferably 7 phr.

A crosslinking accelerator and accelerator activator can be used in combination with the sulfur-containing crosslinking agent.

As the crosslinking accelerator, those which are conventionally used for nitrile rubber are mentioned. The crosslinking accelerator preferably includes thiuram accelerators, thiazole accelerators and sulfenamide accelerators. As specific examples of the thiuram accelerator, there can be mentioned tetramethylthiuram monosulfide, tetramethylthiuram disulfide, tetramethylthiuram monosulfide and tetraethylthiuram disulfide. As specific examples of the thiazole accelerator, there can be mentioned 2-mercaptobenzothiazole and dibenzothiazyl disulfide. As specific examples of the sulfenamide accelerator, there can be mentioned N-cyclohexyl-2-benzothiazylsulfenamide and N-oxydiethylene-2-benzothiazylsulfenamide. These crosslinking accelerators may be used as a combination of at least two thereof. The amount of the crosslinking accelerator is preferably not larger than 12 phr and more preferably not larger than 10 phr.

The accelerator activator is not particularly limited, and include, for example, fatty acids, fatty acid metal salts and metal oxides. As specific examples of the fatty acid, there can be mentioned stearic acid, oleic acid and lauric acid. As specific examples of the fatty acid metal salts, there can be mentioned zinc salts of the above-recited fatty acids. The amounts of fatty acid and fatty acid zinc salt are preferably not larger than 5 phr and more preferably not larger than 3 phr. As specific examples of the metal oxides, there can be mentioned zinc oxide and magnesium oxide. The amount of metal oxide is preferably not larger than 15 phr and more preferably not larger than 10 phr.

The organic peroxide crosslinking agent is not particularly limited, and, as specific examples thereof, there can be mentioned dicumyl peroxide, di-t-butyl peroxide, t-butylcumyl peroxide, benzoyl peroxide, 2,4-dichlorobenzoyl peroxide, 2,5-dimethyl-2,5-di(t-butylperoxy)-hexyne-3, 1,1-di-(t-butylperoxy)-3,3,5-trimethylcyclohexane, 1,3-di(t-butylperoxyisopropyl)benzene, 2,5-dimethyl-2,5-di(benzoylperoxy)hexane and t-butylperoxy benzoate. These organic peroxide crosslinking agents may be used as a combination of at least two thereof. The amount of organic peroxide crosslinking agent is such that the lower limit is 0.1 phr and preferably 0.2 phr, and the upper limit is 10 phr, preferably 8 phr and more preferably 5 phr.

In combination with the organic peroxide crosslinking agent, a compound having at least two cross-linking unsaturated bonds in the molecule can be used as a crosslinking activator. As specific examples of the crosslinking activator, there can be mentioned ethylene dimethacrylate, diallyl phthalate, N,N-m-phenylene dimaleimide, divinylbenzene, triallyl isocyanurate, trimethylolpropane trimethacryalte and liquid vinyl polybutadiene. These crosslinking activators may be used as a combination of at least two thereof. The amount of crosslinking activator is preferably not larger than 10 ppm and more preferably not larger than 5 ppm.

Crosslinking Agent ($C_B$) for Epihalohydrin Rubber (A)

The crosslinking agent ($C_B$) for epihalohydrin rubber includes, for example, thioureas, triazines, quinoxalines and amines. Of these, thioureas and triazines are preferable in view of the crosslinking property. As specific examples of the thioureas, there can be mentioned ethylene thiourea, diethylthiourea, dibutylthiourea, dilaurylthiourea, trimethylthiourea and diphenylthiourea. Of these, ethylene thiourea is preferable. The triazines used are triazine compounds having at least two mercapto groups, which may have a substituent such as, for example, alkyl group, alkyamino group or dialkylamino group, each alkyl group having 1 to 10 carbon atoms. As specific examples of the triazines, there can be mentioned 2,4,6-trimercapto-s-triazine, 2-methyl-4,6-dimercapto-s-triazine, 2-ethylamino-4,6-dimercapto-s-trazine and 2-diethylamino-4,6-dimercapto-s-triazine. Of these, 2,4,6-trimercapto-s-triazine is preferable. The quinoxalines include 2,3-dimercaptoquinoxaline compounds and quinoxaline-2,3-dithiocarbonate compounds. These compounds may have an alkyl substituent with 1 to 4 carbon atoms. As specific examples of the quinoxalines, there can be mentioned 2,3-dimercaptoquinoxaline, quinoxaline-2,3-dithiocarbonate, 6-methylquinoxaline-2,3-dithiocarbonate, 6-isopropylquinoxaline-2,3-dithiocarbonate and 5,8-dimethylquinoxaline-2,3-dithiocarbonate. The amines include polyamine compounds having 2 to 20 carbon atoms.

As specific examples of the amines, there can be mentioned hexamethylene diamine, triethylene tetramine, tetraethylene pentamine, N,N'-dicinnamylidene-1,6-hexanediamine, hexamethylene diamine carbamate and 4,4'-methylenebis(cyclohexylamine)carbamate. The amount of the crosslinking agent ($C_B$) for epihalohydrin rubber is such that the lower limit is 0.1 phr and preferably 0.2 phr, and the upper limit is 8 phr and preferably 5 phr.

An acid acceptor and a crosslinking accelerator can be used in combination with the crosslinking agent ($C_B$) for epihalohydrin rubber.

The acid acceptor includes, for example, oxides, hydroxides, carbonates, carboxylates, silicates, borates, metaborates and phosphites of metals of group II of the periodic table; oxides, basic carbonates, basic carboxylates, basic phosphites, basic sulfites and tribasic sulfates of metals of group IVA of the periodic table; and hydrotalcites represented by the general formula: $Mg_xAl_y(OH)_{2X+3Y-2}CO_3 \cdot wH_2O$ wherein X is a number of 1 to 10, Y is a number of 1 to 5, and w is a real number. As specific examples of the acid acceptor, there can be mentioned magnesium oxide, magnesium hydroxide, barium hydroxide, magnesium carbonate, barium carbonate, calcium oxide (quicklime), calcium hydroxide (slaked lime), calcium carbonate, calcium silicate, magnesium metaborate, calcium metaborate, barium metaborate, calcium stearate, zinc stearate, tin stearate, calcium phthalate, calcium phosphite, zinc oxide, tin oxide, basic tin phosphite, $Mg_{4.5}Al_2(OH)_{13}CO_3 \cdot 3.5H_2O$, $Mg_{4.5}Al_2(OH)_{13}CO_3$ and $Mg_6Al_2(OH)_{16}CO_3 \cdot 4H_2O$. The amount of the acid acceptor is preferably not larger than 20 phr and more preferably 15 phr.

The crosslinking accelerator includes, for example, organic bases having a dissociation constant pKa of at least 7, salts of organic bases capable of producing bases having a dissociation constant pKa of at least 7, and organic acid salts having a dissociation constant pKa of at least 7(see Dai Yuki Kagaku, compiled under the supervision of Mujio Kotake, annex vol. 2 [manual of Constants in Organic Chemistry], p585–613, published by Asakura Shoten). As examples of the organic bases, there can be mentioned aliphatic amines and aromatic amines, which have 1 to 20 carbon atoms, guanidines having a substituent such as an alkyl or aryl group having 1 to 10 carbon atoms, and nitrogen-containing cyclic compounds having 3 to 20 carbon atoms.

As specific examples of the organic gases, there can be mentioned benzylamine, dibenzylamine, guanidine, diphenylguanidine, diorthotolylguanidine, piperidine, pyrrolidine, 1,8-diaza-bicyclo(5,4,0)undecene-7 (DBU) and N-methylmorpholine. The organic gases are not limited thereto. Of these, diphenylguanidine and 1,8-diaza-bicyclo(5,4,0)undecene-7 are preferable.

As examples of the salts of organic bases, there can be mentioned carbonate salts, phenol salts, hydrochloride salts, sulfate salts and oxalate salts of the above-recited organic bases. As examples of the organic acid salts, there can be mentioned sodium salts, potassium salts, zinc salts and piperidine salts of dithiocarbamic acids. The dithiocarbamic acids include dithiocarbamic acid compounds having a substituent such as an alkyl or aryl group having 1 to 10 carbon atoms. As specific examples of the dithiocarbamic acid compounds, there can be mentioned dimethyldithiocarbamic acid, diethyldithiocarbamic acid, dibutyldithiocarbamic acid, ethylphenyldithiocarbamic acid and dibenzyldithiocarbamic acid. The amount of the crosslinking accelerator is preferably not larger than 8 phr and more preferably 5 phr.

Other Ingredients

The rubber composition of the present invention can contain other ingredients such as a reinforcer, a filler, a plasticizer, an antioxidant, a crosslinking retarder and a processing aid.

The reinforcer includes, for example, carbon black and silica.

The filler includes, for example, calcium carbonate, clay and talc.

The plasticizer includes, for example, di(butoxyethoxyethyl) adipate, di(2-ethylhexyl) adipate and di-(2-ethylhexyl) phthalate.

The antioxidant includes, for example, 2-mercaptobenzimidazole, a polymerized product of 2,2,4-triethyl-1,2-dihydroquinoline and nickel dibutyldithiocarbamic acid.

The crosslinking retarder includes, for example, N-cyclohexylthiophthalimide, phthalic anhydride and acetylsalicylic acid.

The processing aid includes, for example, fatty acids such as stearic acid and hydroxystearic acid, and salts of these fatty acids, fatty acid esters such as sorbitan stearate and n-butyl stearate, and fatty acid amides such as stearamide, oleylamide and laurilamide.

The amount of those ingredients is appropriately chosen depending upon the processing conditions and properties required for the crosslinked rubber product.

The method of preparing the rubber composition for a hose of the present invention is not particularly limited. For example, the rubber composition is prepared by a method of mixing together nitrile rubber (A), epihalohydrin rubber (B), crosslinking agent ($C_A$) for nitrile rubber (A) and/or crosslinking agent ($C_B$) for epihalohydrin rubber (B), and other ingredients by using a kneader such as an open roll, Banbury mixer or an internal mixer. The order of mixing the respective ingredients is not particularly limited. For example, first, nitrile rubber (A) and epihalohydrin rubber (B) are mixed together, and then the other ingredients are mixed with the rubber mixture; or, each of nitrile rubber (A) and epihalohydrin rubber (B) is mixed together with other ingredients, and the two rubber mixtures are mixed together.

The rubber composition for a hose of the present invention preferably exhibits an adequate rubber hardness when it is crosslinked. The hardness of a crosslinked rubber is such that the lower limit of the JIS A hardness is preferably 40°, more preferably 50° and especially preferably 60°, and the upper limit thereof is preferably 95°, more preferably 90° and especially preferably 85°. When the hardness of a crosslinked rubber is too low, problems sometimes to arise in that the connection failure is caused between a hose and a fitting, and a hose is bent leading to prevention of flow of fluid stream. In contrast, when the hardness of a crosslinked rubber is too high, the hose becomes too rigid, and handling and fitting properties occasionally becomes poor. The hardness of rubber can be adjusted by appropriately choosing the kinds and amounts of a crosslinking agent, a crosslinking accelerator, a reinforcer, a filler and a plasticizer.

Hose

The hose of the present invention has a layer comprised of a crosslinked product of the rubber composition for a hose of the present invention. That is, the hose of the present invention has either a single layer structure comprised of a crosslinked product of the rubber composition of the present invention, or a multi-layer structure comprising at least one layer comprised of a crosslinked product of the rubber composition of the present invention.

The crosslinking of the rubber composition of the present invention for the production of a hose is carried out after the rubber composition is shaped into a form of hose.

The shaping of the rubber composition of the present invention into a hose form can be carried out by various methods and an adequate method can be chosen depending upon the structure and shape of hose. The shaping method is not particularly limited and includes, for example, an extrusion method using a single screw extruder or a multi-screw extruder, and a molding method using an injection molding machine, a transfer molding machine or a press molding machine. The shaping conditions employed are appropriately chosen in consideration of productivity, viscosity of the rubber composition and the extent of progress of crosslinking reaction. Thus shaping temperature and shaping time are appropriately chosen so that the shapability is not deteriorated.

As for the crosslinking conditions, adequate crosslinking temperature and crosslinking time are chosen depending upon the particular characteristics of the rubber composition. Usually the crosslinking temperature is in the range of 80° C. to 250° C., preferably 100° C. to 230° C., and the crosslinking time is in the range of 20 seconds to 30 hours, preferably 1 minute to 24 hours. According to the need, a secondary crosslinking can be carried out.

The method of heating for crosslinking the rubber composition includes, for example, a high-pressure high-temperature steam heating method, a high-temperature air heating method, a high-temperature co-molten salt heating method, a high-frequency heating method, and a method of placing the rubber composition within a mold heated by electrical heating. Usually the rubber composition of a hose shape is heated within a high-pressure can by using high-pressure and high-temperature steam. The rubber composition of a hose shape is usually prepared by an extrusion method, but, the method of shaping is not particularly limited and other methods can be employed.

To satisfy various properties required for a hose, the hose of the present invention may have a layer comprised of a crosslinked product of other rubber composition or a layer comprised of an oil-resistant resin.

The rubber composition used for forming the layer contained in combination with the layer formed from the rubber composition of the present invention, includes, for example, a nitrile rubber, a hydrogenated nitrile, an epihalohydrin rubber, a chloroprene rubber, chlorosulfonated polyethylene, chlorinated polyethylene, an acrylic rubber and a fluororubber. The rubber compositions comprising these rubbers are prepared by incorporating a crosslinking agent and a crosslinking activator, which are adequate for the respective rubbers, in the rubbers.

As specific examples of the oil-resistant resin, there can be mentioned a fluoro-resin, a fluorine-containing thermoplastic elastomer, a nylon resin, a thermoplastic polyamide elastomer, a polyester resin, a thermoplastic polyester elastomer and a thermoplastic polyurethane elastomer.

The hose of the present invention may have a reinforcing layer comprised of, for example, a natural fiber, a chemical fiber or a metal wire. As specific examples of the natural fiber, there can be mentioned cotton and linen. As specific examples of the chemical fiber, there can be mentioned rayon, vinylon, nylon, polyester fiber and polypropylene fiber. As specific examples of the metal wire, there can be mentioned a stainless steel wire and a steel wire.

When the hose of the present invention has a multi-layer structure with adjacent layers comprised of different kinds of ingredients, a special adhesive can be applied between the adjacent layers or an adhesion-enhancing aid can be incorporated in the rubber composition, to improve the inter-layer bonding force.

For making a hose having a multi-layer structure, the same hose-shaping method can be repeated plural times or a plurality kinds of shaping methods can be combined. For example, there can be employed a method wherein an innermost rubber composition layer of a hose is formed on the peripheral of a mandrel by using a first extruder, a reinforcing layer comprised of a polyester layer is formed on the peripheral of the innermost rubber composition layer, and then an outermost rubber composition layer is formed on the peripheral of the reinforcing layer by using a second extruder.

The hose of the present invention has a crosslinked rubber layer formed from the rubber composition of the present invention and exhibiting well balanced resistance to fuel permeation and cold resistance. Therefore, the hose of the present invention prevents or minimized a liquid fuel such as gasoline, kerosine and gas oil, and gaseous fuel to permeate through the hose wall and to be dissipated into the air, and the hose exhibits good cold resistance.

The hose of the present invention can be used, for example, as a fuel oil hose, a fuel gas hose, a lubricating oil hose and an air hose. Especially the hose is suitable for use, in which the desired hose characteristics are required at a low temperature below −30° C., such as automobile parts.

As specific examples of the hose used as automobile parts, there can be mentioned hoses used in a fuel system, a brake system, a power-steering system, a control system, an air-conditioning system, an air suction system, an oil-cooling system, a clutch system and a suspension system. More specifically, the fuel system includes, for example, a fuel hose and a fuel inlet hose. The brake system includes, for example, a hydraulic brake hose and a vacuum brake hose. The power steering system includes, for example, a high-pressure power steering hose and a suction hose. The control system includes, for example, a ventilation hose and a vacuum-sensing hose. Of these hoses, the hose of the present invention is especially suitable for a fuel hose and a fuel inlet hose, for which a high resistance to fuel permeation is required.

The invention will now be specifically described by the following examples and comparative examples. In these, working examples, parts and percents are by weight.

EXAMPLE 1

(Preparation of Rubber Composition)

Using a Banbury mixer, 50 parts of nitrile rubber A1, 50 parts of epihalohydrin rubber B1, 30 parts of carbon black (#60 available from Asahi Carbon Co., Ltd.), 1.0 part of stearic acid. 10 parts of a plasticizer ("Thiokol TP-95"™ available from Morton International Ltd.), 5 parts of zinc oxide (zinc flower #1 available from Sakai Chem. Ind. Co., Ltd.) and 1.5 parts of an acid acceptor (magnesium oxide, "Kyowa Mag 150"™ available from Kyowa Chem. Ind. Co., Ltd.) were kneaded together. The kneaded mixture was mixed with 1.0 part of crosslinking agent $C_A1$ for nitrile rubber (sulfur), 1.0 part of a crosslinking accelerator ("Nocceler DM"™ available from Ouchi Shinko Chemical Industrial Co., Ltd.) and 2.0 parts of crosslinking agent $C_B1$ for epihalohydrin rubber (ethylene thiourea, "Accel 22"™, available from Kawaguchi Chem. Ind. Co., Ltd.) by using an open roll to prepare a rubber composition.

(Preparation of Crosslinked Rubber Sheet and Tensile Tests)

The obtained rubber composition was crosslinked at 160° C. for 15 minutes by using a steam platen press to prepare a crosslinked rubber sheet having a thickness of 2 mm. Tensile strength, breaking elongation and hardness of the crosslinked rubber sheet were measured according to JIS K630. The results are shown in Table 1.

(Test of Resistance to Fuel Oil Permeation of Crosslinked Rubber Sheet)

Resistance of fuel oil permeation of the crosslinked rubber sheet was measured as follows. 50 ml of a test fuel oil C (mixture of isooctane/toluene [50/50 by volume]) was placed in 100 ml tare volume aluminum cup, and a crosslinked rubber sheet cut into a circular shape having a diameter of 61 mm was tented on the open-end edge of the cup by a clamp. The cup was kept the bottom up at 23° C. within a thermostat. The whole weight of the cup was measured at every 24 hours to determine the reduction in weight of fuel oil per hour. The measurement was repeated until the weight reduction became constant. The amount of fuel oil permeated through the crosslinked rubber sheet per day was calculated from the contact area of the crosslinked rubber sheet with the fuel oil, and the thickness of the crosslinked rubber sheet. The fuel oil permeation as measured on the crosslinked rubber sheet is shown in Table 1. The smaller the measured value for fuel oil permeation, the more excellent the crosslinked rubber sheet in resistance to fuel oil permeation.

(Test for Cold Resistance of Crosslinked Rubber Sheet)

Cold resistance of the crosslinked rubber sheet was measured by a low-temperature impact brittleness testing method according to JIS K6301. The low-temperature impact brittle point is shown in Table 1. The lower the low-temperature impact brittle point, the more excellent the crosslinked rubber sheet in cold resistance.

(Production of Hose)

The rubber composition was extruded into a tube having an inner diameter of 10 mm and a wall thickness of 2.0 mm by using a single-screw extruder. A metal mandrel having an outer diameter of 10 mm was inserted into the rubber tube. The rubber tube/metal mandrel composite was placed in a pressure-resistant can, and then heated at 160° C. for 45 minutes by high-pressure steam heating to be thereby crosslinked. Thereafter the mandrel was drawn from the rubber tube to make a cylindrical hose having a single layer structure.

(Test of Resistance to Fuel Oil Permeation of Hose)

Resistance of fuel oil permeation of the hose was measured as follows. The hose was cut to a length of 200 mm. A metal rod having a diameter of 10 mm and a length of 20 mm was inserted into one end of the cut hose, and the metal rod-inserted end portion was sealed with a teflon tape. 12 ml of fuel oil C was introduced into the hose through the open end thereof, and then this end portion was sealed in the same manner as the metal rod-inserted end portion. Then the hose was left to stand at 23° C. for 48 hours within a thermostat. The fuel oil permeation was calculated from the weight of the oil-introduced hose as measured before and after the standing at 23° C. for 48 hours. The fuel oil permeation as measured on the hose is shown in Table 1. The smaller the measured value for fuel oil permeation, the more excellent the hose in resistance to fuel oil permeation.

(Test for Cold Resistance of Hose)

Cold resistance of the hose was measured as follows. The hose cut into a length of 200 mm was left to stand for 2 hours within a thermostat maintained at a predetermined temperature. Flexural test was conducted at a folding angle of 90° while the hose was maintained at that temperature. After the test, occurrence of cracks was examined. The test temperature was −30° C. and −35° C. The test results are shown in Table 1. Rating "A" means that crack occurrence was not observed, and rating "B" means that crack occurrence was observed. When crack occurrence is not observed at a lower temperature, the hose is excellent in cold resistance.

EXAMPLES 2–4

COMPARATIVE EXAMPLES 1–3

The tests were conducted in the same manner as in Examples 1 except that the rubber compositions shown in Tables 1 and 2 were used with all other conditions remaining the same. The results obtained in Examples 2–4 are shown in Table 1, and the results obtained in Comparative Examples 1–3 are shown in Table 2.

TABLE 1

| | Examples | | | |
|---|---|---|---|---|
| Example No. | 1 | 2 | 3 | 4 |
| Composition (parts) | | | | |
| Nitrile rubber A1*[1] | 50 | — | — | 40 |
| Acrylonitrile unit content: 53% | | | | |
| Nitrile rubber A2*[2] | — | 60 | 70 | — |
| Acrylonitrile unit content: 50% | | | | |
| Nitrile rubber A3*[3] | — | — | — | — |
| Acrylonitrile unit content: 42.5% | | | | |
| Epihalohydrin rubber B1*[4] | 50 | — | 30 | — |
| Epihalohydrin rubber B2*[5] | — | 40 | — | 60 |
| Crosslinking agent $C_A1$ for nitrile rubber: sulfur | 1 | 1 | 1.5 | 1 |
| Crosslinking accelerator*[6] | 1 | 1 | 1.5 | 1 |
| Acid acceptor: magnesium oxide*[7] | 1.5 | 1.5 | — | 1.5 |
| Crosslinking agent $C_B1$ for epihalohydrin rubber*[8] | 2 | 2 | — | — |
| Crosslinking agent $C_B2$ for epihalohydrin rubber*[9] | — | — | — | 0.5 |
| Properties of crosslinked rubber sheet | | | | |
| Permeation of fuel oil C (g · mm/m$^2$ · day) | 195 | 205 | 214 | 225 |
| Low-temp. impact brittle point (° C.) | −28 | −27 | −27 | −32 |
| Tensile strength (MPa) | 15.2 | 15.6 | 15.7 | 14.8 |
| Breaking elongation (%) | 290 | 310 | 350 | 330 |
| Hardness (JIS A) | 69 | 71 | 70 | 71 |
| Properties of hose | | | | |
| Permeation of fuel oil C (g/day) | 0.25 | 0.29 | 0.32 | 0.34 |
| Cold resistance | | | | |
| at −30° C. | A | A | A | A |
| at −35° C. | A | A | A | A |

TABLE 2

| | Comparative Examples | | |
|---|---|---|---|
| Example No. | 1 | 2 | 3 |
| Composition (parts) | | | |
| Nitrile rubber A1*[1] Acrylonitrile unit content: 53% | — | 90 | 10 |
| Nitrile rubber A2*[2] Acrylonitrile unit content: 50% | — | — | — |
| Nitrile rubber A3*[3] Acrylonitrile unit content: 42.5% | 50 | — | — |
| Epihalohydrin rubber B1*[4] | 50 | — | 90 |
| Epihalohydrin rubber B2*[5] | — | — | — |
| Crosslinking agent $C_A1$ for nitrile rubber: sulfur | 1 | 1 | 1 |
| Crosslinking accelerator*[6] | 1 | 1 | 1 |
| Acid acceptor: magnesium oxide*[7] | 1.5 | 1.5 | 1.5 |
| Crosslinking agent $C_B1$ for epihalohydrin rubber*[8] | 2 | 2 | 2 |
| Crosslinking agent $C_B2$ for epihalohydrin rubber*[9] | — | — | — |

TABLE 2-continued

| Example No. | Comparative Examples | | |
|---|---|---|---|
| | 1 | 2 | 3 |
| Properties of crosslinked rubber sheet | | | |
| Permeation of fuel oil C (g · mm/m$^2$ · day) | 365 | 190 | 345 |
| Low-temp. impact brittle point (° C.) | −32 | −18 | −34 |
| Tensile strength (MPa) | 14.4 | 17.5 | 14.3 |
| Breaking elongation (%) | 320 | 340 | 530 |
| Hardness (JIS A) | 68 | 72 | 69 |
| Properties of hose | | | |
| Permeation of fuel oil C (g/day) | 0.64 | 0.23 | 0.59 |
| Cold resistance | | | |
| at −30° C. | A | B | A |
| at −35° C. | A | B | A |

*$^1$"Nipol DN002" ™ available from Nippon Zeon Co., acrylonitrile content: 53%, ML$_{1+4}$,100° C.: 50
*$^2$"Nipol DN003" ™ available from Nippon Zeon Co., acrylonitrile content: 50%, ML$_{1+4}$,100° C.: 78
*$^3$"Nipol DN101L" ™ available from Nippon Zeon Co., acrylonitrile content: 42.5%, ML$_{1+4}$,100° C.: 60
*$^4$"Gechron 3100" ™ available from Nippon Zeon Co., epichlorohydrin-ethylene oxide-allyl glycidyl ether terpolymer, ML$_{1+4}$, 100° C.: 70
*$^5$"Gechron 1100" ™ available from Nippon Zeon Co., epichlorohydrin-allyl glycidyl ether copolymer, ML$_{1+4}$,100° C.: 58
*$^6$"Nocceler DM" ™ available from Ouchi Shinko Chemical Industrial Co., Ltd., dibenzothiazyl disulfide
*$^7$"Kyowa Mag 150" ™ available from Kyowa Chem. Ind. Co., Ltd., magnesium oxide
*$^8$"Accel 22" ™ available from Kawaguchi Chem. Ind. Co., Ltd., ethylene thiourea
*$^9$2,4,6-trimercapto-s-triazine, supplied by Sankyo Kasei Co., Ltd.

The rubber composition used in Comparative Example 1 contained a nitrile rubber A3 having an acrylonitrile content smaller than that of a nitrile rubber used in the present invention. Therefore, the crosslinked rubber of Comparative Example 1 is greatly inferior in resistance to fuel oil permeation as compared with the crosslinked rubber of Example 1.

The rubber composition used in Comparative Example 2 contained a nitrile rubber in an amount larger than that in the rubber composition of the present invention. Therefore, the crosslinked rubber of Comparative Example 2 is greatly inferior in cold resistance as compared with the crosslinked rubber of Example 1.

The rubber composition used in Comparative Example 3 contained a nitrile rubber in an amount smaller than that in the rubber composition of the present invention. Therefore, the crosslinked rubber of Comparative Example 3 is greatly inferior in resistance to fuel oil permeation as compared with the crosslinked rubber of Example 1.

In contrast, the rubber compositions in Examples 1 to 4 and hoses having a layer comprised of each of the rubber compositions have well balanced resistance to fuel oil resistance and cold resistance.

INDUSTRIAL APPLICABILITY

In accordance with the present invention, there are provided a rubber composition capable of forming a hose having excellent resistance to fuel oil resistance and cold resistance, and further provided a hose having a layer comprised of said rubber composition. The hose of the present invention is especially suitable for a fuel oil hose of an automobile.

What is claimed is:

1. A rubber composition for a hose, which comprises a nitrile rubber (A) comprising 45 to 55% by weight of α,β-ethylenically unsaturated nitrile monomer units and 55 to 45% by weight of conjugated diene monomer units, an epihalohydrin rubber (B), and a crosslinking agent (C$_A$) for the nitrile rubber (A) and a crosslinking agent (C$_B$) for the epihalohydrin rubber (B); the amount of the nitrile rubber (A) being in the range of 45 to 70% by weight based on the sum of the nitrile rubber (A) and the epihalohydrin rubber (B).

2. The rubber composition according to claim 1, wherein the total amount of the crosslinking agent (C$_A$) for the nitrile rubber (A) and the crosslinking agent (C$_B$) for the epihalohydrin rubber (B) is in the range of 0.1 to 8 parts by weight based on 100 parts by weight of the sum of the nitrile rubber (A) and the epihalohydrin rubber (B).

3. The rubber composition according to claim 1, wherein the nitrile rubber (A) has a Mooney viscosity of 25 to 100.

4. The rubber composition according to claim 1, wherein the α,β-ethylenically unsaturated nitrile monomer is acrylonitrile or methacrylonitrile.

5. The rubber composition according to claim 1, wherein the conjugated diene monomer is 1,3-butadiene, 2-methyl-1,3-butadiene, 1,3-pentadiene or 2-chloro-1,3-butadiene.

6. The rubber composition according to claim 1, wherein the epihalohydrin rubber (B) has a Mooney viscosity of 30 to 140.

7. The rubber composition according to claim 1, wherein the epihalohydrin rubber (B) is a copolymer of an epihalohydrin monomer and an unsaturated epoxide monomer.

8. The rubber composition according to claim 7, wherein the epihalohydrin monomer is epichlorohydrin.

9. The rubber composition according to claim 1, wherein the crosslinking agent (C$_A$) for the nitrite rubber is at least one crosslinking agent selected from the group consisting of a sulfur-containing crosslinking agent and an organic peroxide crosslinking agent.

10. The rubber composition according to claim 1, wherein the crosslinking agent (C$_B$) for the epihalohydrin rubber is at least one crosslinking agent selected from the group consisting of a thiourea, a triazine, a quinoxaline and an amine.

11. A hose having a layer comprised of a crosslinked product of the rubber composition as claimed in any one of claims 1 and 3 to 10.

* * * * *